United States Patent
May

(10) Patent No.: US 12,535,885 B2
(45) Date of Patent: Jan. 27, 2026

(54) FIELD-OF-VIEW ADJUSTMENT BASED ON DISPLAY POSITION

(71) Applicant: Microsoft Technology Licensing, LLC, Redmond, WA (US)

(72) Inventor: Keenan Russell May, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/740,223

(22) Filed: Jun. 11, 2024

(65) Prior Publication Data
US 2025/0377718 A1    Dec. 11, 2025

(51) Int. Cl.
*G02B 27/01*    (2006.01)
*G06F 1/16*    (2006.01)
*G06F 3/01*    (2006.01)

(52) U.S. Cl.
CPC ............. *G06F 3/013* (2013.01); *G06F 1/163* (2013.01)

(58) Field of Classification Search
CPC .................................. G06F 3/013; G06F 1/163
See application file for complete search history.

(56) References Cited

U.S. PATENT DOCUMENTS

| | | | |
|---|---|---|---|
| 8,976,086 B2 * | 3/2015 | Hilkes | G02B 27/0176 345/8 |
| 9,753,687 B1 * | 9/2017 | Cronin | G02B 27/017 |
| 10,228,727 B1 * | 3/2019 | Pickett | A45F 5/00 |
| 10,510,137 B1 * | 12/2019 | Kitain | F41G 3/2611 |
| 2014/0347572 A1 * | 11/2014 | Liu | G02F 1/1362 29/411 |
| 2016/0353098 A1 * | 12/2016 | Stein | G02B 30/24 |
| 2018/0332420 A1 * | 11/2018 | Salume | H04S 3/002 |
| 2020/0029050 A1 * | 1/2020 | Antunes | H04N 23/667 |
| 2020/0064631 A1 * | 2/2020 | Robbins | G02B 27/0093 |
| 2022/0091722 A1 * | 3/2022 | Faulkner | G06F 3/04815 |
| 2022/0137705 A1 * | 5/2022 | Hashimoto | G06F 3/04815 345/156 |
| 2024/0103288 A1 * | 3/2024 | Kollgaard | H05K 5/0017 |
| 2024/0201505 A1 * | 6/2024 | Skye | G02B 27/0149 |
| 2025/0086898 A1 * | 3/2025 | Furtwangler | G06F 3/017 |

* cited by examiner

*Primary Examiner* — Christopher E Leiby
(74) *Attorney, Agent, or Firm* — Alleman Hall LLP

(57) ABSTRACT

A head-mounted device includes a display, a display position sensor, a logic subsystem, and a storage subsystem. The display is configured to display a graphical user interface including one or more user interface elements in a field of view of the display. The display position sensor is configured to output a position signal indicating a position of the display relative to eyes of a user wearing the head-mounted device. The storage subsystem holds instructions executable by the logic subsystem to receive the position signal from the display position sensor and generate control signals to adjust at least one of a position of the one or more user interface elements in the field of view and a size of the field of view of the display based at least on the position of the display indicated by the position signal.

20 Claims, 12 Drawing Sheets

FIELD-OF-VIEW ADJUSTMENT BASED ON DISPLAY POSITION

BACKGROUND

Head-mounted devices (HMD), such as augmented-reality or mixed-reality devices, may be adjustable in terms of a position of a display of the HMD relative to a position of eyes of a user wearing the HMD. In one example, such an adjustment may involve 'eye relief' (moving the display closer or farther from the eyes of user in the Z-direction). There are many reasons to perform an 'eye relief' adjustment of the display of the HMD. In one example, a user may desire to wear the device over the top of large protective eyewear, such as safety goggles. In another example, a user may want to place the device very close to their eyes in order to maximize the amount of their visual field of vision that is 'augmented' via the display. Similarly, there may be other forms of spatial adjustment of the display position relative to the eyes of the user other than eye relief, such as moving the display higher in the field of vision of the user. In one example, the user may pivot the display upward in order to look through binoculars. In another example, the user may pivot the display upward to directly inspect an object without looking through the display.

SUMMARY

A head-mounted device includes a display, a display position sensor, a logic subsystem, and a storage subsystem. The display is configured to display a graphical user interface including one or more user interface elements in a field of view of the display. The display position sensor is configured to output a position signal indicating a position of the display relative to eyes of a user wearing the head-mounted device. The storage subsystem holds instructions executable by the logic subsystem to receive the position signal from the display position sensor and generate control signals to adjust at least one of a position of the one or more user interface elements in the field of view and a size of the field of view of the display based at least on the position of the display indicated by the position signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
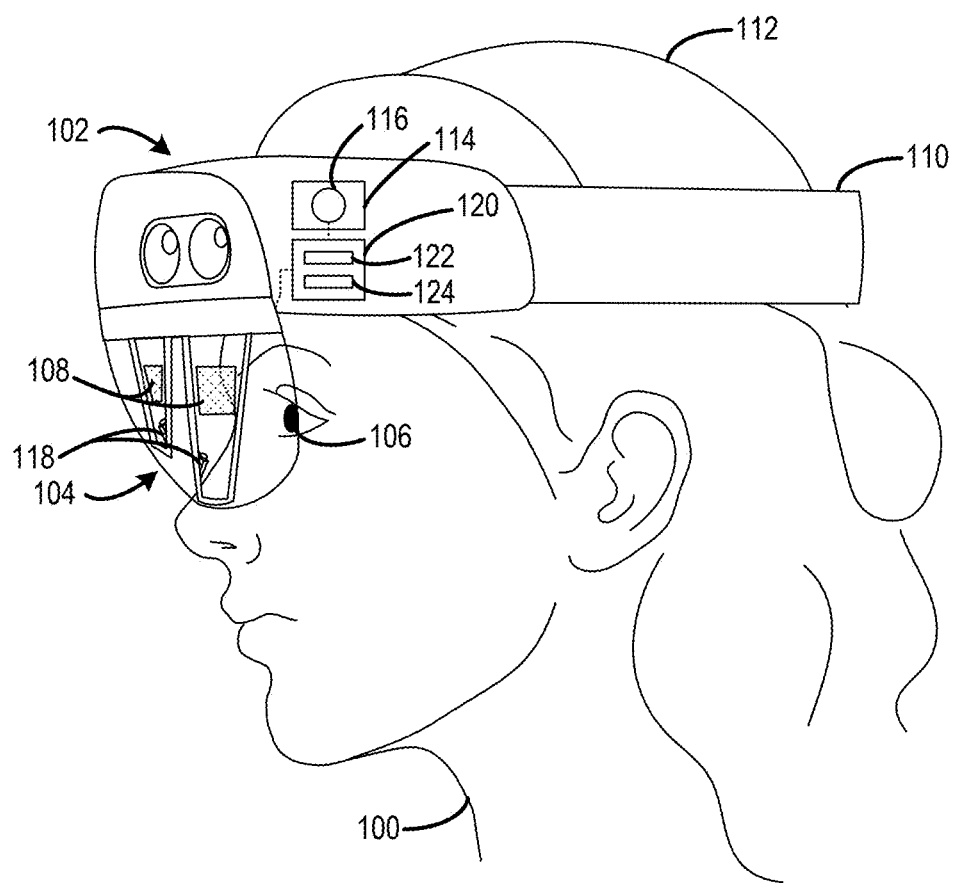
FIG. 1 shows an example head-mounted device (HMD) including a display positioned in a default position relative to eyes of a user wearing the HMD.

Head-mounted devices (HMD), such as augmented-reality or mixed-reality devices, may be adjustable in terms of a position of a display of the HMD relative to a position of eyes of a user wearing the HMD. In one example, such an adjustment may involve 'eye relief' (moving the display closer or farther from the eyes of user in the Z-direction). In another example, the user may pivot or tilt the display relative to the position of the eyes of the user. Conventional HMDs include displays that have a field of view (FOV) with a fixed size regardless of the position of the display relative to the eyes of the user. As used herein, the FOV refers to a region of the display that is illuminated to display an image frame. More particularly, the FOV is defined be a set of pixels of the display that is illuminated to display an image frame. Thus, the FOV may increase or decrease depending on the number of pixels that are illuminated to display an image frame. Additionally, conventional HMDs have graphical user interfaces (GUIs) having static arrangements of user interface elements that do not change based on a position of the display relative to the eyes of the user wearing the HMD.

The fixed-size of the FOV and the static arrangement of user interface elements in the GUI of conventional HMDs pose several issues when the position of the display is adjusted relative to the position of the eyes of the user. As one example, the display can be adjusted to a position where a portion of the FOV is occluded from view of the eyes of the user, such as a peripheral region of the FOV. In this instance, the user may be unable to view user interface elements that are positioned in the occluded portion of the FOV, and thus may miss visual cues or notification that are associated with the occluded user interface elements. As another example, the display can be adjusted to a position where the FOV is larger than the field of vision of the eyes of the user. In this instance, the display is activating pixels in the FOV that are outside the field of vision of the eyes of the user. Activation of these pixels needlessly consumes power since the eyes of the user cannot see those pixels regardless of whether the pixels are activated or not.

Accordingly, to address these and other issues, the present disclosure is directed to an HMD including a display that is configured to have a FOV that is dynamically adjustable based at least on a position of the display relative to eyes of a user wearing the HMD. Additionally, an arrangement of user interface elements in a GUI displayed in the FOV of the display are dynamically adjustable based at least on the position of the display relative to the eyes of the user wearing the HMD. More particularly, in one example, the HMD includes a display position sensor that is configured to output a position signal indicating a position of the display relative to the eyes of the user wearing the HMD. The HMD further includes a storage subsystem holding instructions executable by a logic subsystem of the HMD to receive the position signal from the display position sensor and generate control signals to adjust at least one of a position of the user interface elements in the FOV and a size of the FOV of the display based at least on the position of the display indicated by the position signal.

The position of the user interface elements can be dynamically adjusted in the GUI based at least on the position of the display relative to the eyes of the user. This technical feature provides the technical benefit of enabling the user to view the user interface elements in the GUI even when the position of the display is adjusted relative to the eyes of the user to where the user interface elements would normally be occluded or difficult to view. Additionally, the size of the FOV of the display can be dynamically adjusted based at least on the position of the display relative to the eyes of the user. This technical feature provides the technical benefit of allowing the user to view the entire FOV even when the position of the display is adjusted relative to the eyes of the user to where the FOV would normally be occluded or difficult to view. Moreover, any pixels that are outside the FOV and beyond the field of vision of the eyes of the user can be deactivated in order to reduce power consumption of the display. In general, such technical features provide the technical benefit of allowing a user to freely wear the HMD and position the display in a manner which best suits their current need, while still allowing the user to view critical information displayed in the GUI of the display.

FIG. 1 shows a user 100 wearing an HMD 102 including a display 104 that is adjustable to different positions relative to eyes 106 of the user 100. The display 104 is configured to display a GUI 204 (shown in FIG. 204B) including one or more user interface elements 206. The GUI 204 is fit to the size of the FOV 108 of the display 104. The HMD 102 is configured to adjust a size of the FOV 108 of the display 104 and/or a position of the user interface element(s) 206 in the GUI 204 displayed in the FOV 108 based at least on the position of the display 104. The HMD 102 comprises a frame 110 that is configured to secure the HMD 102 to a head 112 of the user 100. The display 104 is coupled to the frame 110, such that the display 104 is positioned in a field of vision 202 (shown in FIG. 2A) of the eyes 106 of the user 100. The field of vision 202 of the user 100 refers to the entire area that can be seen when the eyes 106 of the user 100 are fixed in one position. In some implementations, the display 104 is a laser-based display that that will be discussed in further detail with reference to FIG. 10. In other implementations, the display 104 may take the form of a different type of display.

A hinge 114 is coupled between the frame 110 and the display 104. The hinge 114 is configured to adjust the position of the display 104 relative to the frame 110, and correspondingly relative to the eyes 106 of the user 100. In some implementations, the hinge 114 is configured to adjust the position of the display 104 in one degree of freedom (e.g., pivot or Z-direction eye relief adjustment). In other implementations, the hinge 114 is configured to adjust the position of the display 104 in two or more degrees of freedom (e.g., pivot and Z-direction eye relief adjustment).

A display position sensor 116 is configured to output a position signal indicating a position of the display 104 relative to the eyes 106 of the user 100. More particularly, in the illustrated implementation, the display position sensor 116 is configured to detect a position of the hinge 114, and the position of the display 104 is derived based at least on the position of the hinge 114. In some implementations, the display position sensor 116 may include a Hall Effect sensor that is configured to detect the position of the hinge 114. In other implementations, the display position sensor 116 may include a different type of sensor.

In some implementations, the HMD 102 may include eye tracking cameras 118 that are configured to track respective positions of the eyes 106 of the user 100. The HMD 102 may be configured to employ any suitable eye tracking techniques to identify the position of the eyes 106 of the user 100 based at least on images output by the eye tracking cameras 118. In some implementations, the HMD 102 is configured to determine the position of the display 104 based at least on one or more images output by the eye tracking cameras 118. In such implementations, the eye tracking cameras 118 effectively function as a display position sensor. In some implementations, the images output by the eye tracking cameras 118 and the position signal output by the display position sensor 116 may be analyzed in conjunction to determine the position of the display 104. By using these components together, redundancy can be increased to improve the accuracy of the position determination of the display 104.

The HMD 102 comprises a computing system 120 including a logic subsystem 122 and a storage subsystem 124. The storage subsystem 124 holds instructions executable by the logic subsystem 122 to generate control signals that control operation of the HMD 102. In particular, the storage subsystem 124 holds instructions executable by the logic subsystem 122 to receive the position signal from the display position sensor 116 and generate control signals to adjust the position of the user interface element(s) 206 in the GUI 204 in the FOV 108 and/or a size of the FOV 108 of the display 104 based at least on the position of the display 104.

In FIG. 1, the display 104 is positioned in a first "default" position relative to the eyes 106 of the user 100. In the default position, the display 104 is configured to be a designated eye relief distance from eyes of an average user and has a pivot angle of zero (e.g., the display 104 is substantially parallel with the eyes 106 of the user 100. The position of the display 104 is indicated by a position signal output by the display position sensor 116.

Figure 2A:
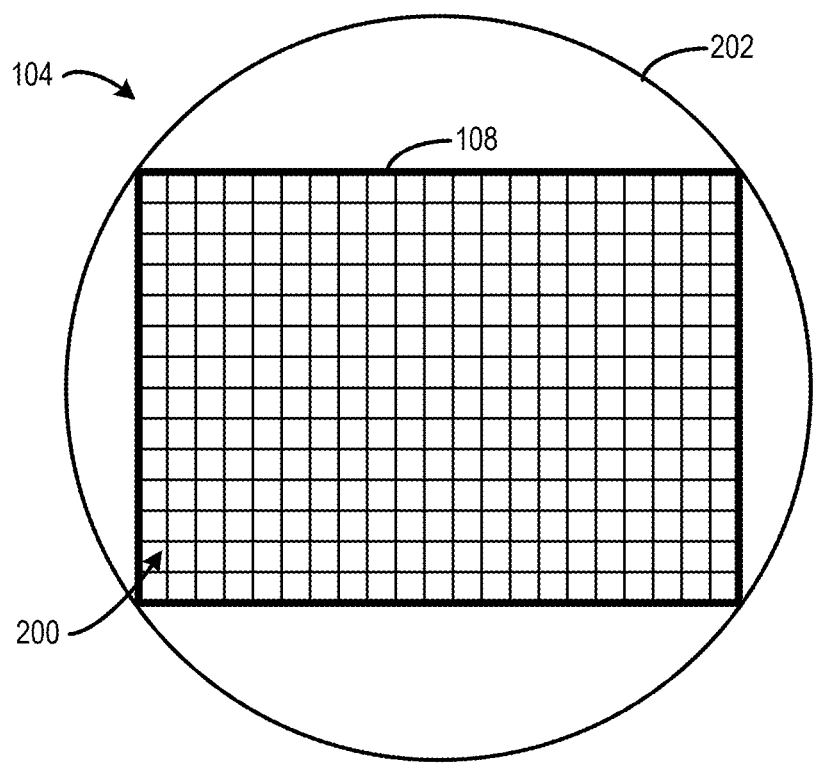
FIG. 2A shows a position and size of a field of view (FOV) of the display when the display is positioned as shown in FIG. 1

FIG. 2A shows the FOV 108 of the display 104 when the display is positioned in the default position shown in FIG. 1. Note that the illustrated FOV 108 corresponds to a single eye of the user 100 and the display 104 is configured to generate the same or similar FOVs for each eye 106 of the user 100. The display 104 comprises a plurality of pixels 200. In this example, the plurality of pixels 200 are all within the field of vision 202 when the display 104 is positioned at the default position. Correspondingly, the FOV 108 is set to a first size and position that includes the plurality of pixels 200. The pixels included in the FOV 108 are referred to as 'activated' pixels that are illuminated by the display to form an image frame in the FOV 108. In implementations where the display 104 is a laser-based display, the activated pixels in the FOV 108 are scanned by the laser-based display to form an image frame in the FOV 108. In this example, all of the plurality of pixels 200 of the display 104 are included in the FOV 108, and thus are activated pixels that are scanned by the laser-based display.

Figure 2B:
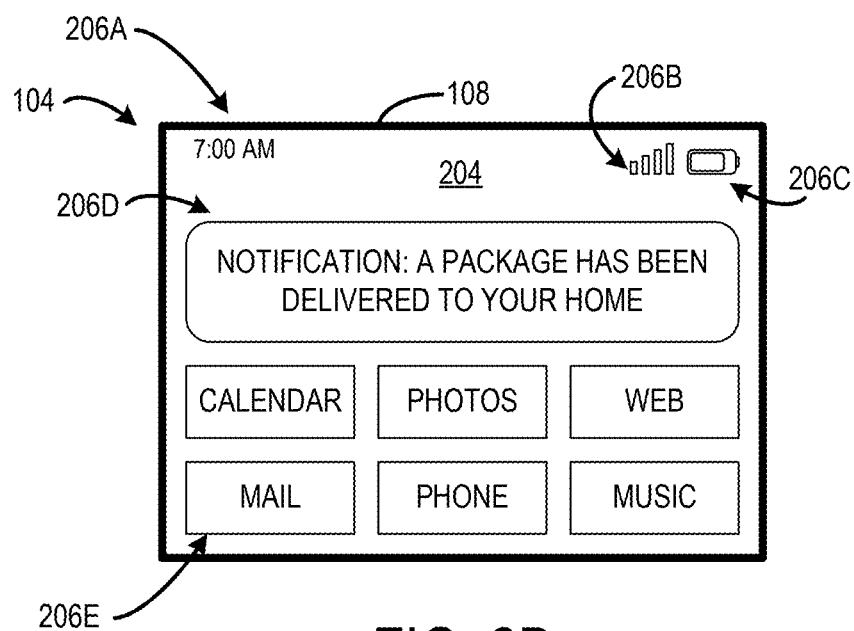
FIG. 2B shows an arrangement of a plurality of user interface elements in a graphical user interface (GUI) in the FOV of the display when the display is positioned as shown in FIG. 1.

FIG. 2B shows the GUI 204 that is in the FOV 108 of the display 104 when the display is in the default position shown in FIG. 1. The GUI 204 includes a plurality of user interface elements 206 (e.g., 206A, 206B, 206C, 206D, 206E) that are set to first default positions in the GUI 204. The default positions of the user interface elements 206 are set assuming that the FOV 108 of the display 104 is fully within the field of vision 202 of the eyes 106 of the user 100. The plurality of user interface elements 206 include a clock 206A positioned in an upper left corner of the GUI 204, a network connectivity meter 206B and a battery charge meter 206C that are positioned in the upper right corner of the GUI 204, a notification 206D that is positioned in the center of the GUI 204, and a plurality of application program icons 206E that are positioned in the lower portion of the GUI 204.

Figure 3:
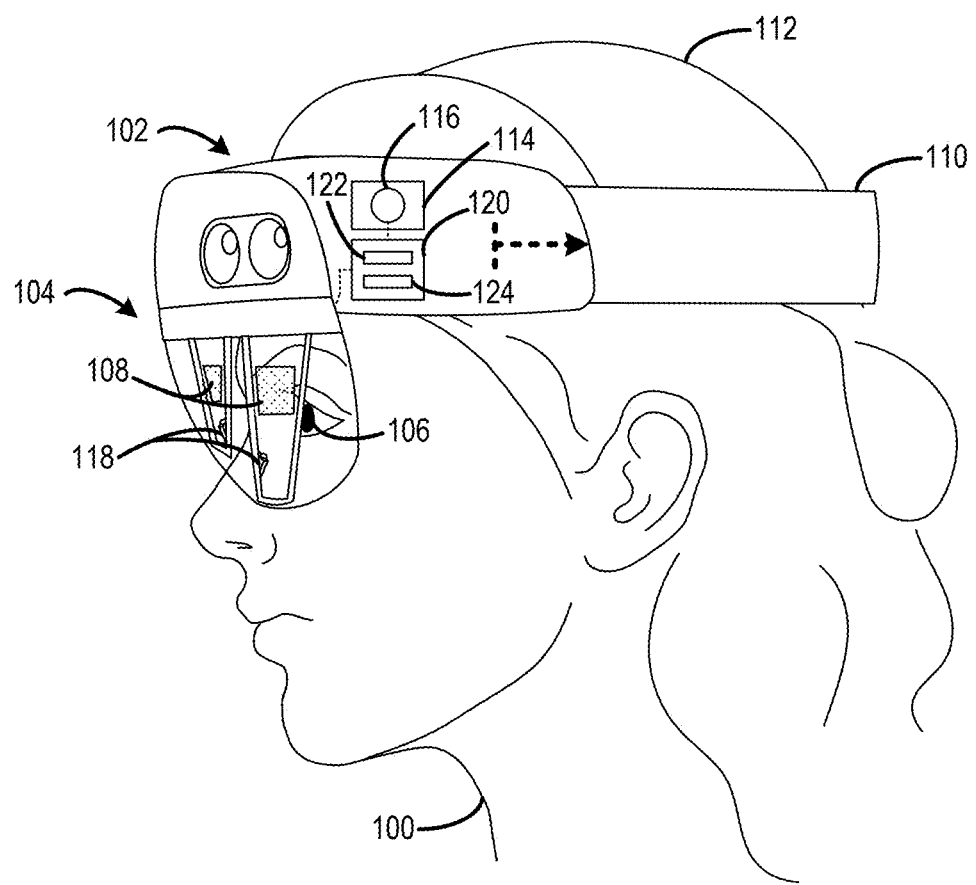
FIG. 3 shows the HMD of FIG. 1 with the display moved closer to the eyes of the user relative to the default position shown in FIG. 1.

FIG. 3 shows the HMD 102 of FIG. 1 with the display 104 moved closer to the eyes 106 of the user 100 relative to the default position shown in FIG. 1. More particularly, the position of the display 104 is adjusted via the hinge 114 by sliding the display 104 in the Z-direction relative to the frame 110 to move the display 104 closer to the eyes 106 of the user 100. The position of the display 104 is indicated by a position signal output by the display position sensor 116. As one example, the user 100 may adjust the display 104 closer to their eyes 106 in order to have a greater portion of their field of vision 202 'augmented' with content displayed via the display 104. As another example, the user 100 may have a smaller head size than the average user for which the default position is designed, so the user 100 may adjust the display 104 to better view the content displayed via the display 104.

Figure 4A:
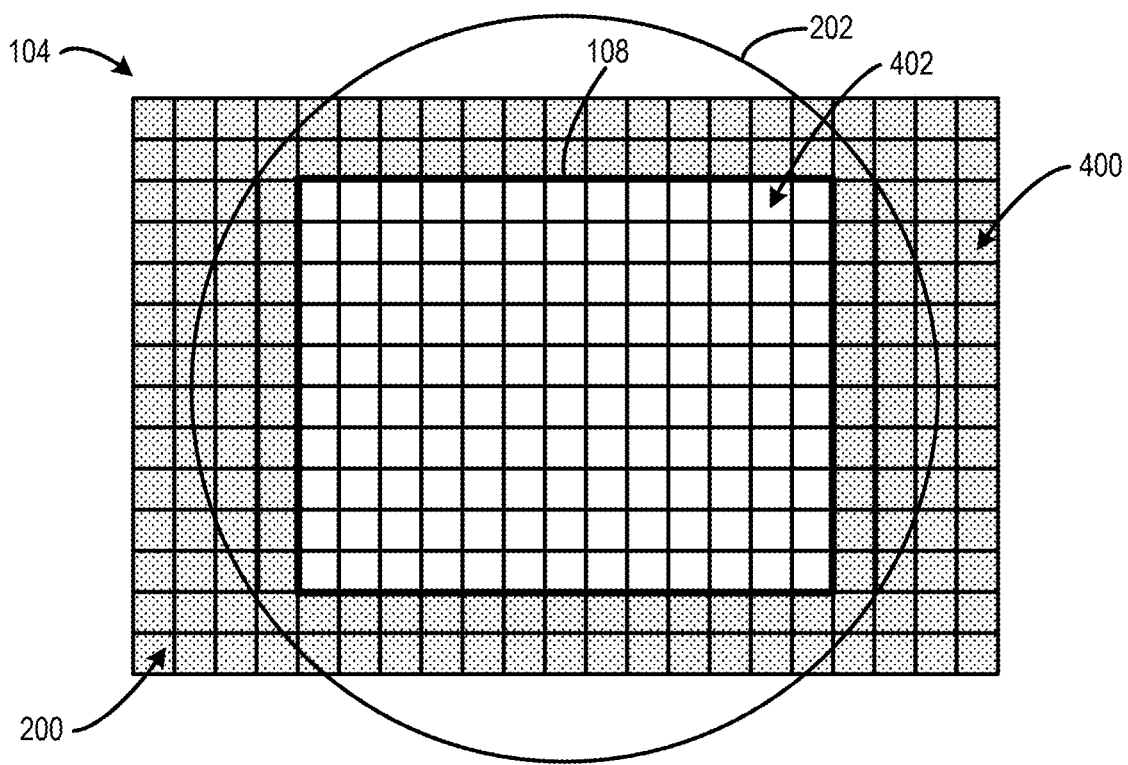
FIG. 4A shows a position and size of the FOV of the display when the display is positioned as shown in FIG. 3.

FIG. 4A shows a position and size of the FOV 108 of the display 104 when the display 104 is positioned as shown in FIG. 3—e.g., closer to the eyes 106 of the user 100 relative to the default position. The display 104 is moved closer to the eyes 106 of the user 100, such that a region of the display 104 resides outside the field of vision 202 of the user 100. More particularly, a first subset of pixels 400 of the plurality of pixels 200 of the display 104 is positioned outside of the field of vision 202 of the user 100 and a second subset of pixels 402 of the plurality of pixels 200 is positioned inside the field of vision 202 of the user 100. The first subset of pixels 400 is excluded from the FOV 108 and the second subset of pixels 402 is included in the FOV 108. In this instance, the size of the FOV 108 is set to a second size that is smaller than the first size of the FOV 108 as shown in FIG. 2A. In other words, the FOV 108 is smaller due to a reduced number of pixels being included in the FOV 108 that are illuminated to display an image frame relative to the default size of the FOV 108. However, the user 100 may perceive the FOV 108 as being the same or similar in size due to the display 104 being moved closer to the eyes 106 of the user 100 relative to the default position of the display 104 shown in FIG. 1. In some implementations, the size of the FOV 108 may be set to maintain a same angular field of view when the display 104 is in the first position shown in FIG. 1 and when the display is in the second position shown in FIG. 3.

Note that the pixels in the first subset 400 that are excluded from the FOV 108 when the FOV 108 is set to the second size are referred to as 'deactivated' pixels and are not illuminated when an image frame is displayed in the FOV 108. In implementations where the display 104 is a laser-based display, the pixels of the first subset 400 that are excluded from the FOV 108 are deactivated pixels that are not scanned by the laser-based display to form an image frame in the FOV 108. Correspondingly, the pixels of the second subset 402 are 'activated' pixels that are included in the FOV 108 and scanned by the laser-based display to form an image frame in the FOV 108. By illuminating only the subset of pixels 402 that are within the field of vision 202 of the user 100, the HMD 102 may reduce power consumption relative to a conventional HMD that is configured to illuminate all pixels of a display regardless of some pixels of the display being outside the field of vision 202 of the user 100. Such a reduction in power consumption may prolong battery life of the HMD 102 among other benefits.

Figure 4B:
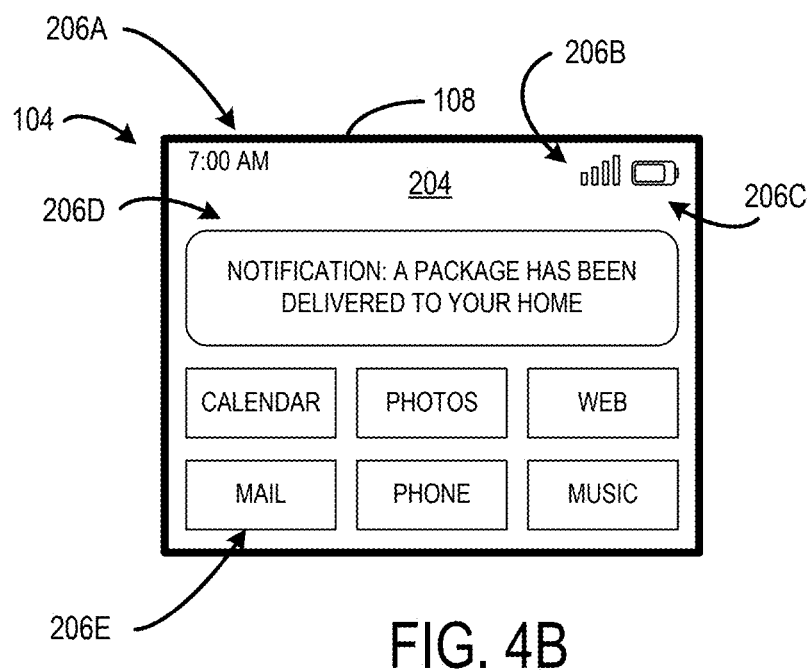
FIG. 4B shows the arrangement of the plurality of user interface elements in the GUI in the FOV of the display when the display is positioned as shown in FIG. 3.

FIG. 4B shows the GUI 204 that is in the FOV 108 of the display 104 when the display is in the position shown in FIG. 3—e.g., closer to the eyes 106 of the user 100 relative to the default position. The arrangement of the plurality of user interface elements 206 in the GUI 204 when the display 104 is positioned as shown in FIG. 3 is the same as when the display 104 is positioned as shown in FIG. 1. However, since the FOV 108 is smaller when the display 104 is positioned closer to the eyes 106 of the user 100 as shown in FIG. 3 than when the display 104 is positioned in the default position as shown in FIG. 1, the plurality of user interface elements 206 are smaller in size to fit within the smaller FOV 108. Although the plurality of user interface elements 206 are smaller in size, since the display 104 is positioned closer to the eyes 106 of the user 100, the user may perceive the plurality of user interface elements 206 as appearing to be the same size. In this way, the display of content within the GUI 204 may be perceived in a consistent manner even as the position of the display 104 changes relative to the eyes 106 of the user 100.

Figure 5:
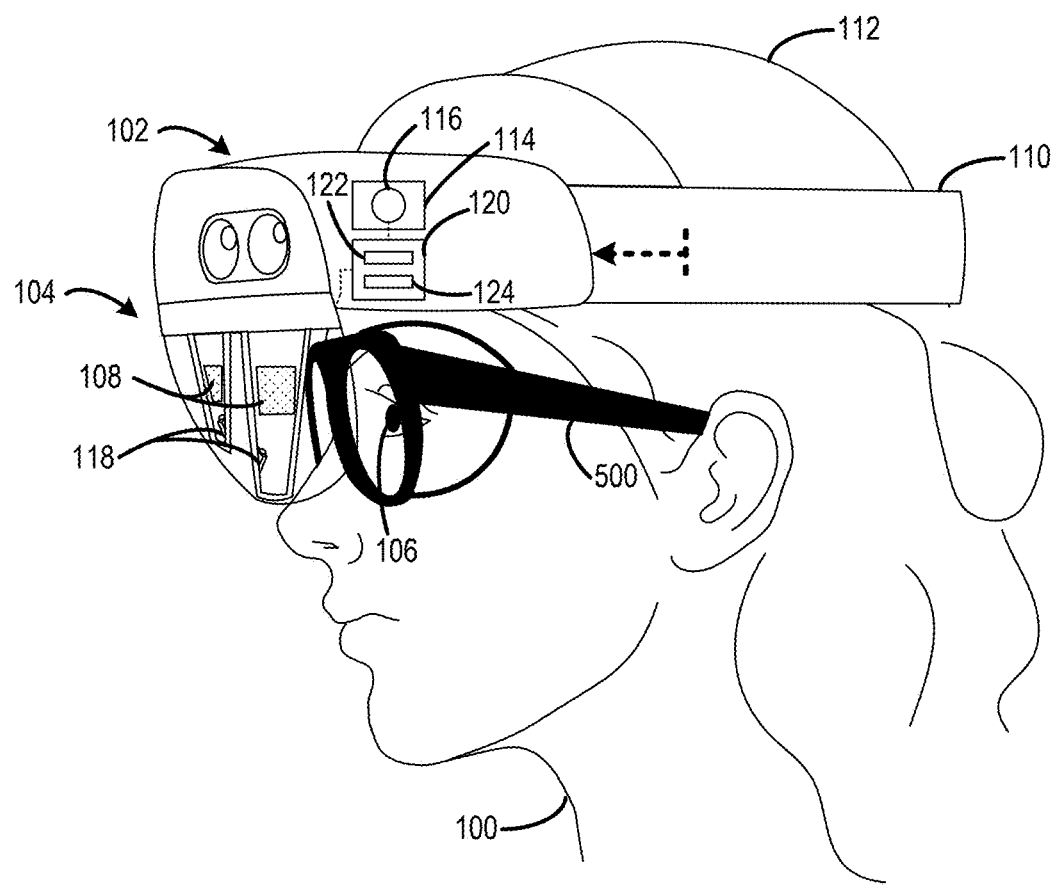
FIG. 5 shows the HMD of FIG. 1 with the display moved further from the eyes of the user relative to the default position shown in FIG. 1.

FIG. 5 shows the HMD 102 with the display 104 moved further from the eyes 106 of the user 100 relative to the default position shown in FIG. 1. More particularly, the position of the display 104 is adjusted via the hinge 114 by sliding the display 104 in the Z-direction relative to the frame 110 to move the display 104 further away from the eyes 106 of the user 100. The position of the display 104 is indicated by a position signal output by the display position sensor 116. In this example, the user 100 adjusts the position of the display 104 to accommodate a pair of goggles 500 worn by the user 100. The user may adjust the position of the display 104 in the same manner for various other reasons as well.

Figure 6A:
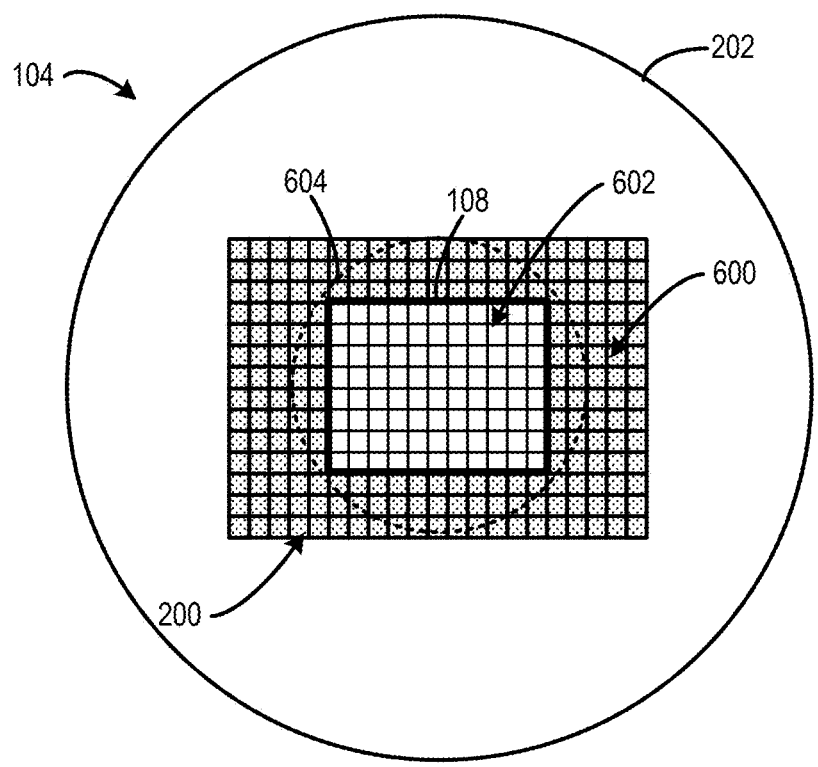
FIG. 6A shows a position and size of the FOV of the display when the display is positioned as shown in FIG. 5.

FIG. 6A shows a position and size of the FOV 108 of the display 104 when the display 104 is positioned as shown in FIG. 5—e.g., further from the eyes 106 of the user 100 relative to the default position. When the display 104 is moved away from the eyes 106 of the user 100 by greater than a threshold distance, a phenomenon occurs where a region of the display becomes occluded by vignetting in which at least some of the light emitted by the display 104 does not reach the eyes 106 of the user 100. This scenario is akin to aligning the eyes 106 of the user 100 to look through a porthole to view a scene on the other side of the porthole. Only light that can reach the eyes 106 through the porthole can be perceived. In implementations where the display 104 is a laser-based display, the vignetting phenomenon results from laser light emitted from the laser-based display being configured to have a designated focal distance that corresponds to the default position of the display 104. When the display 104 is moved further away than the default position and beyond the designated focal distance, at least some of the laser light does not reach the eyes 106 of the user 100.

In the illustrated example, a first subset of pixels 600 of the plurality of pixels 200 of the display 104 that reside outside a vignetting region 604 are occluded from the eyes 106 of the user even though the first subset of pixels 600 are within the field of vision 202 of the user 100. A second subset of pixels 602 of the plurality of pixels 200 reside within the vignetting region 604 and are visible by the eyes 106 of the user 100. In this instance, the first subset of pixels 600 is excluded from the FOV 108 and the second subset of pixels 602 are included in the FOV 108. Thus, the FOV 108 is reduced in size relative to the FOV when the display 104 is in the default position shown in FIG. 1.

Note that the pixels in the first subset 600 that are excluded from the FOV 108 are deactivated pixels and are not illuminated when an image frame is displayed in the FOV 108. In implementations where the display 104 is a laser-based display, the deactivated pixels of the first subset 600 are not scanned by the laser-based display to form an image frame in the FOV 108. Correspondingly, the activated pixels of the second subset 602 are included in the FOV 108 and are scanned by the laser-based display to form an image frame in the FOV 108. By illuminating only the pixels of the second subset 602 that are within the FOV 108 without illuminated the pixels of the first subset 600, the HMD 102 may reduce power consumption relative to a conventional HMD that is configured to illuminate all pixels of a display regardless of some pixels of the display being occluded from the eyes 106 of the user 100. Such a reduction in power consumption may prolong battery life of the HMD 102 among other benefits.

Figure 6B:
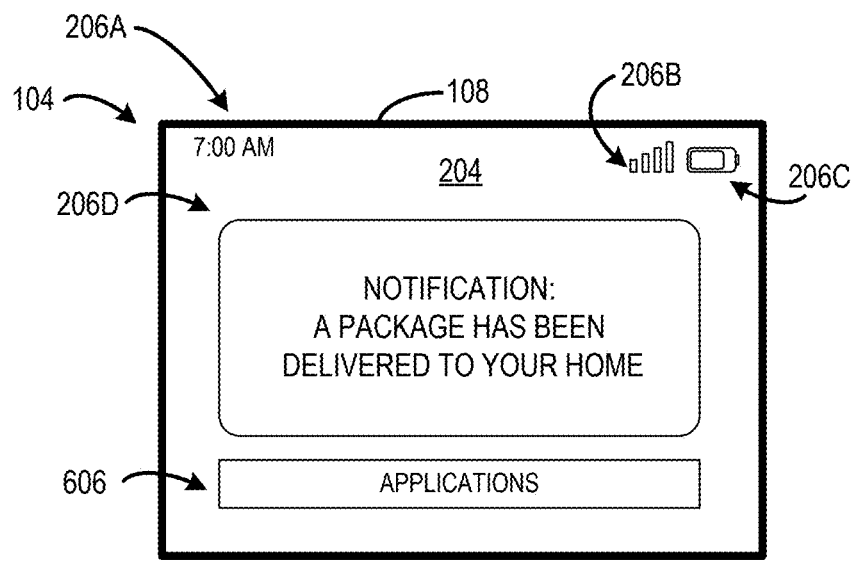
FIG. 6B shows the arrangement of the plurality of user interface elements in the GUI in the FOV of the display when the display is positioned as shown in FIG. 5.

FIG. 6B shows the GUI 204 that is displayed in the FOV 108 of the display 104 when the display is in the position shown in FIG. 5—e.g., further from the eyes 106 of the user 100 relative to the default position. The arrangement of the plurality of user interface elements 206 in the GUI 204 when the display 104 is positioned as shown in FIG. 5 is adjusted to compensate for the smaller size of the FOV 108 that is viewed from a greater distance relative when the display 104 is positioned in the default position. In particular, the notification 206D is enlarged to remain easily viewable by the eyes 106 of the user 100. Further, the plurality of individual application program icons (206E shown in FIGS. 2B and 4B) are collapsed into a single application icon 606 that occupies less space in the GUI 204 relative to the individual application program icons. For example, the user 100 may select the application icon 606 to cause a separate expanded menu of application program icons to be displayed in the GUI 204. Additionally, the clock 206A, the network connectivity meter 206B, and the battery charge meter 206C remain in the same positions within the GUI 204 relative to when the display 104 is in the default position. By rearranging and resizing selected user interface elements in the GUI 204 based on the display 104 being moved further away from the eyes 106 of the user 100, the user 100 is still able to clearly view critical information in the display without portions of GUI 204 being occluded due to vignetting.

In some implementations, the plurality of user interface elements 206 may be ranked according to a designated criticality of information presented by the user interface elements 206. Further, based on the FOV 108 being reduced relative to the default size, a selection of a subset of user interface elements 206 may be selected based on the priority ranking to be included in the GUI 204 that fits within the reduced-size FOV 108. For example, user interface elements having a higher priority ranking may be included in the GUI 204 over other lower priority ranking user interface elements.

Figure 7:
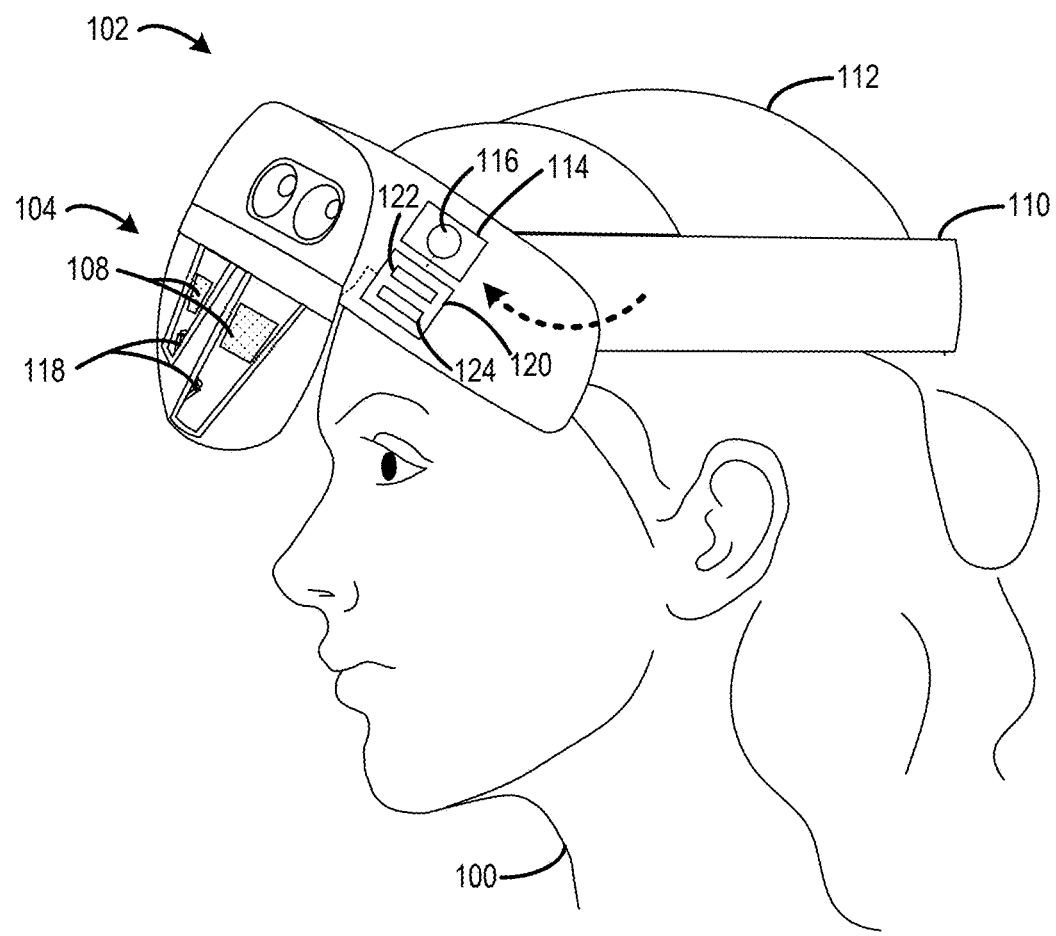
FIG. 7 shows the HMD of FIG. 1 with the display pivoted upward relative to the default position shown in FIG. 1.

FIG. 7 shows the HMD of FIG. 1 with the display pivoted upward relative to the default position shown in FIG. 1. More particularly, the position of the display 104 is adjusted via the hinge 114 by pivoting the display 104 upward relative to the frame 110 to move the display 104 from the default position to a position that is higher than the default position relative to the eyes 106 of the user 100. The position of the display 104 is indicated by a position signal output by the display position sensor 116. As one example, the user 100 may pivot the display 104 upward to view the surrounding environment directly without looking through the display 104. As another example, the user 100 may pivot the display 104 upward to use an optical device, such as a pair of binoculars, a microscope, or the like. The user may adjust the position of the display 104 in the same manner for various other reasons as well.

Figure 8A:
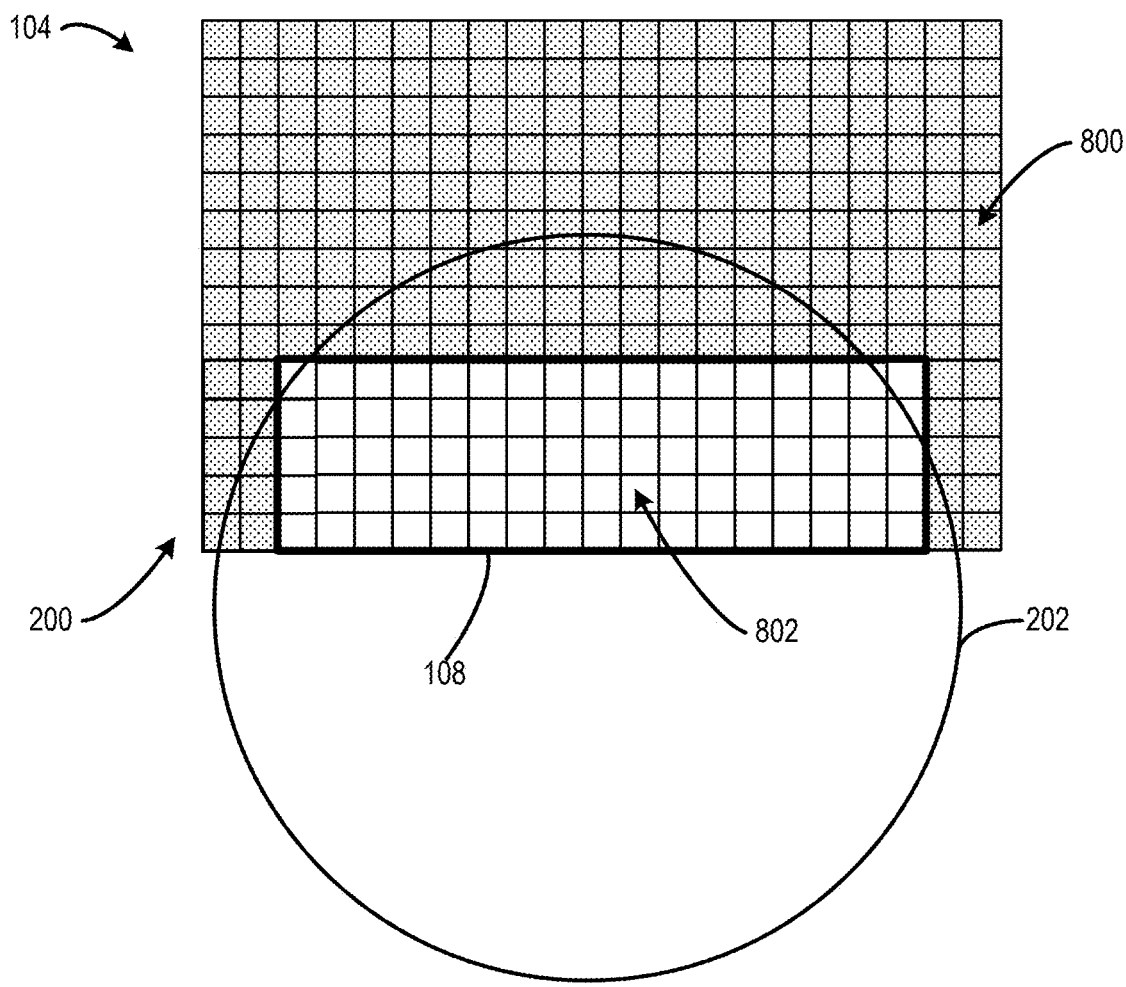
FIG. 8A shows a position and size of the FOV of the display when the display is positioned as shown in FIG. 7.

FIG. 8A shows a position and size of the FOV 108 of the display 104 when the display is positioned as shown in FIG. 7—e.g., pivoted upward relative to the default position. When the display 104 is pivoted upward, an upper region of the display 104 resides outside the field of vision 202 of the user 100. For example, the upper region of the display 104 may be occluded from the eyes 106 of the user 100 by the frame 110 (or other components of the HMD 102). Additionally, peripheral regions of the display 104 reside outside the field of vision 202 of the user 100. Accordingly, the FOV 108 is set to a region of the display 104 that resides within the field of vision 202 of the user 100. More particularly, a first subset of pixels 800 of the plurality of pixels 200 of the display 104 is positioned outside of the field of vision 202 of the user 100 and a second subset of pixels 802 of the plurality of pixels 200 is positioned inside the field of vision 202 of the user 100. The first subset of pixels 800 is excluded from the FOV 108 and the second subset of pixels 802 is included in the FOV 108. In this instance, the size of the FOV 108 is set to a second size that is smaller than the first size of the FOV 108 as shown in FIG. 2A. More particularly, the height of the FOV 108 is reduced due to the occlusion of the upper region of the display 104.

Note that the pixels in the first subset 800 that are excluded from the FOV 108 when the FOV 108 are deactivated pixels that are not illuminated when an image frame is displayed in the FOV 108. In implementations where the display 104 is a laser-based display, the pixels of the first subset 800 that are excluded from the FOV 108 are deactivated pixels that are not scanned by the laser-based display to form an image frame in the FOV 108. Correspondingly, the pixels of the second subset 802 are activated pixels that are scanned by the laser-based display to form an image frame in the FOV 108. By illuminating only the subset of pixels 802 that are within the field of vision 202 of the user 100, the HMD 102 may reduce power consumption relative to a conventional HMD that is configured to illuminate all pixels of a display regardless of some pixels of the display being outside the field of vision 202 of the user 100. Such a reduction in power consumption may prolong battery life of the HMD 102 among other benefits.

Figure 8B:
FIG. 8B shows the arrangement of the plurality of user interface elements in the GUI in the FOV of the display when the display is positioned as shown in FIG. 7.

FIG. 8B shows the arrangement of the plurality of user interface elements 206 in the GUI 204 in the FOV 108 of the display 104 when the display is positioned as shown in FIG. 7—e.g., pivoted upward relative to the default position. The arrangement of the plurality of user interface elements 206 in the GUI 204 when the display 104 is positioned as shown in FIG. 7 is adjusted to compensate for the smaller size of the FOV 108, and more particularly, the reduced height of the FOV 108. In particular, the notification 206D is displayed in a lower region of the display 104 that is visible to the eyes 106 of the user 100. Due to the limited size of the FOV 108, the plurality of individual application program icons (206E shown in FIGS. 2B and 4B) are not displayed in the GUI 204 when the display 104 is positioned as shown in FIG. 7. Additionally, the clock 206A, the network connectivity meter 206B, and the battery charge meter 206C are moved to lower positions in the FOV 108 relative to when the display 104 is in the default position. This allows for these user interface elements to be viewed by the eyes 106 of the user 100. That is, the user 100 does not have to look up as far (e.g., rotate the eyes 106 upward) to see these user interface elements. By rearranging and resizing selected user interface elements in the GUI 204 based on the display 104 being pivoted upward, the user 100 is still able to clearly view critical information in the display without portions of GUI 204 being occluded by other components of the HMD 102.

The scenarios shown in FIGS. 1, 2A-2B, 3, 4A-4B, 5-6A-6B, 7, 8A-8B provide different examples of how a position of one or more user interface elements can be adjusted in the FOV 108 of the display 104 and/or a size of the FOV 108 of the display 104 can be adjusted based at least on the position of the display 104. In other examples, the arrangement of user interface elements 206, the size of the user interface elements 206, and/or the size of the FOV 108 can be adjusted differently based at least on the position of the display 104. In some implementations, the display 104 may be adjusted to other positions. For example, the display 104 may be rotated (e.g., roll, yaw) relative to the eyes 106 of the user 100, and the user interface elements 206 and/or the FOV 108 of the display 104 may be adjusted based at least on the rotation of the display 104. The position of the display 104 may be adjusted in any suitable manner and the user interface elements 206 and/or the FOV 108 may be adjusted in any suitable manner based least on the position of the display 104.

Figure 9:
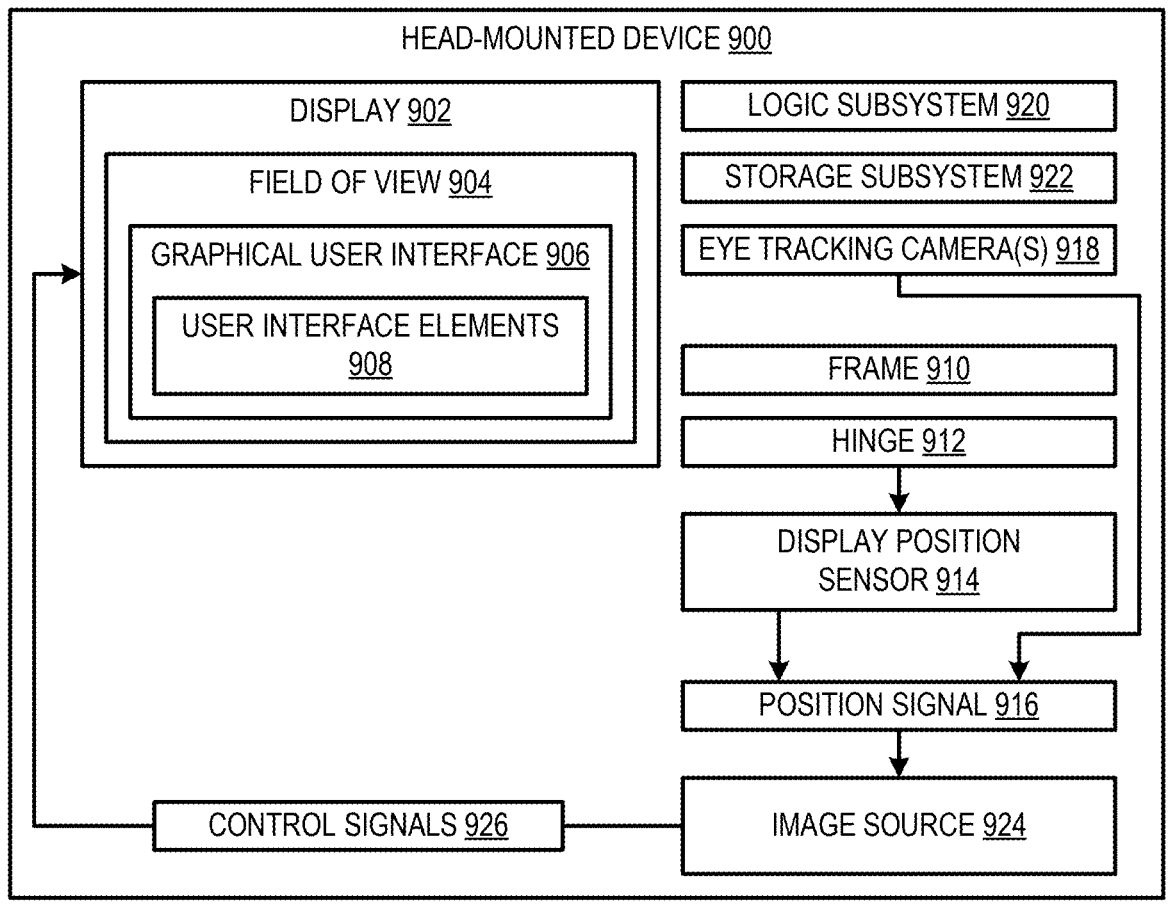
FIG. 9 schematically shows an example HMD.

FIG. 9 schematically shows an example HMD 900. For example, the HMD 900 may correspond to the HMD 102 shown in FIGS. 1, 3, 5, 7. The HMD 900 comprises a display 902 configured to display a GUI 906 including one or more user interface elements 908 in a FOV 904 of the display 902. In some implementations, the display 902 is a laser-based display that will be discussed in further detail with reference to FIG. 10. In other implementations, the display 902 may be a different type of display.

The HMD 900 further comprises a frame 910 configured to secure the HMD 900 to a head of a user wearing the HMD 900. In some implementations, the frame 910 may take the form of a pair of glasses that are worn over the ears of the user. In other implementations, the frame 910 may wrap around the head of the user. In yet other implementations, the frame 910 may be integrated into a helmet worn by the user. In still yet other implementations, the frame 910 may take a different form.

A hinge 912 is coupled between the frame 910 and the display 902. The hinge 912 is configured to adjust the position of the display 902 relative to the frame 910. In some implementations, the hinge 912 is configured to adjust the position of the display 902 in one degree of freedom (e.g., pivot or Z-direction eye relief adjustment). In other implementations, the hinge 912 is configured to adjust the position of the display 902 in two or more degrees of freedom (e.g., pivot and Z-direction eye relief adjustment). The hinge 912 may be configured to adjust the position of the display 902 in any suitable manner.

The HMD 900 further comprises a display position sensor 914 configured to output a position signal 916 indicating a position of the display 902 relative to the eyes of the user wearing the HMD 900. In some implementations, the display position sensor 914 is configured to detect a position of the hinge 912, and the position of the display 902 is determined by the display position sensor 914 based at least on the position of the hinge 912.

In some implementations, the HMD 900 includes one or more eye tracking cameras 918 that are configured to track respective positions of eyes of the user. The HMD 900 may be configured to employ any suitable eye tracking techniques to identify the position of the eyes of the user based at least on images output by the eye tracking camera(s) 918. In some implementations, the HMD 102 is configured to determine the position of the display 104 based at least on one or more images output by the eye tracking camera(s) 918. In such implementations, the eye tracking cameras 918 effectively function as the display position sensor 914. In some implementations, the images output by the eye tracking camera(s) 918 and the position signal 916 output by the display position sensor 914 may be analyzed in conjunction to determine the position of the display 902. By using these components together, redundancy can be increased to improve the accuracy of the position determination of the display 902.

The HMD 900 comprises a logic subsystem 920 and a storage subsystem 922. The storage subsystem 922 holds instructions executable by the logic subsystem 920 to generate control signals that control operation of the HMD 900. In particular, the storage subsystem 922 holds instructions executable by the logic subsystem 920 to instantiate an image source 924. The image source 924 is configured to provide the visual content that is rendered on the display 902. Such visual content can include static images, videos, graphics, text, or any combination thereof. The image source 924 defines the format and resolution of the visual content such that the visual content is in a compatible format and resolution that the display 902 can handle. The image source is configured to receive the position signal 916 from the display position sensor 116 and generate control signals 926 to adjust the position of the user interface element(s) 908 in the GUI 906 in the FOV 904 and/or a size of the FOV 904 of the display 902 based at least on the position of the display 902 indicated by the position signal 916. In some implementations, the image source 924 is configured to set the size of the FOV 904 to maintain a same angular field of view when the display 902 is adjusted from a first position to a second position. In some examples, the image source 924 generate control signals 926 to adjust both the position of the user interface elements 908 in the FOV 904 and the size of the FOV 904 of the display 902 based at least on the position of the display 902 as indicated by the position signal 916. The image source 924 may adjust the arrangement of the user interface elements 908 in GUI 906 and/or the size of the FOV 904 in any suitable manner based at least on the position of the display 902 in order to allow the user to easily view the content in the GUI 906 even as the position of the display 902 is adjusted. Such features allow for a user to freely wear the HMD 900 in the manner which best suits their current need, while still knowing they will not miss critical notifications because they can see the information displayed in the GUI 906 regardless of the position of the display 902.

Figure 10:
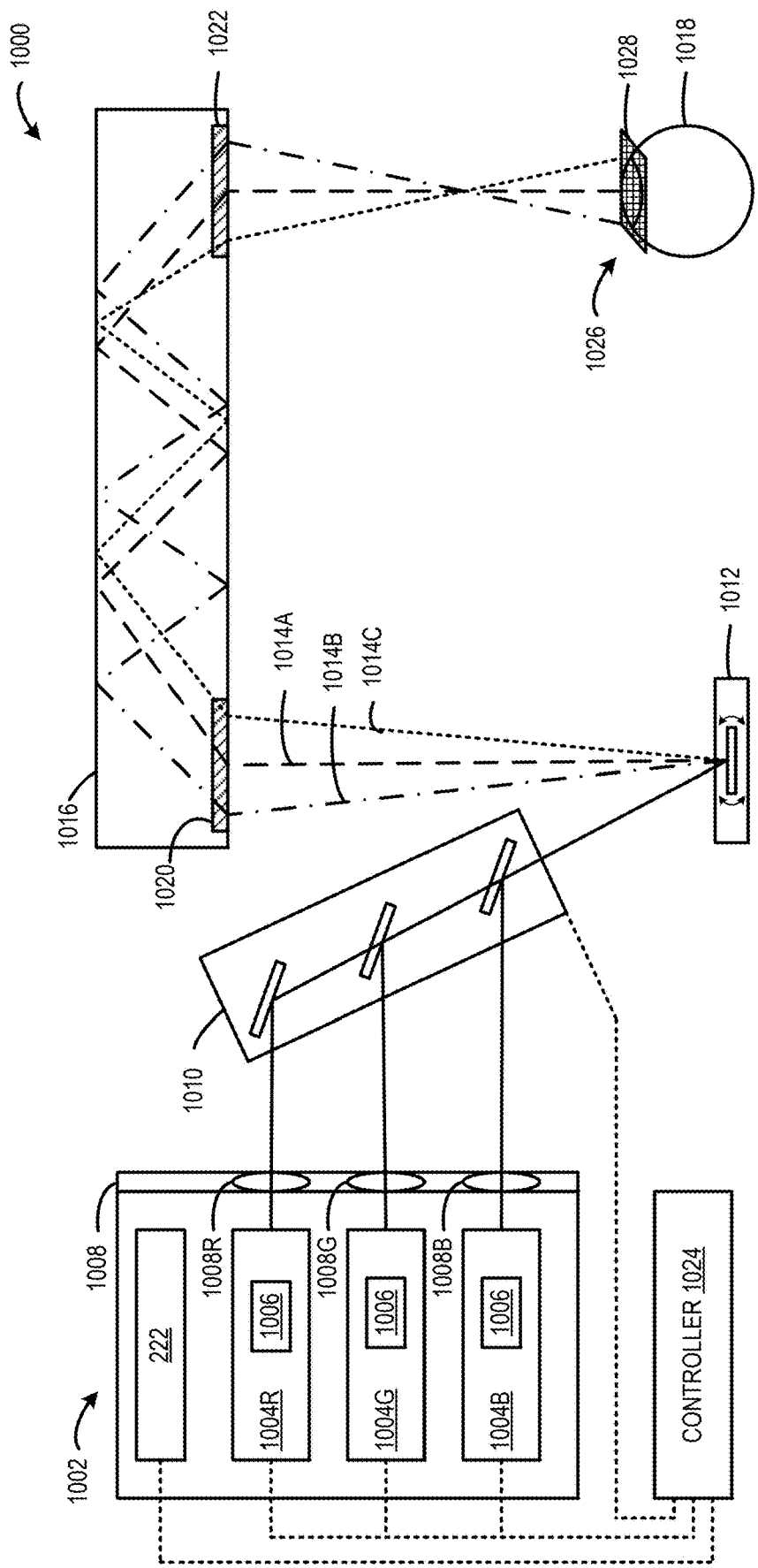
FIG. 10 schematically shows an example laser-based display of the HMD of FIG. 9.

FIG. 10 shows aspects of a laser-based display 1000. For example, the laser-based display 1000 may correspond to the display 902 of the HMD 900 shown in FIG. 1 and the display 104 of the HMD 102 shown in FIGS. 1, 2A-2B, 3, 4A-4B, 5-6A-6B, 7, 8A-8B. Note that FIG. 10 shows a configuration for a left eye of a user and the laser-based display 1000 may include a corresponding configuration for a right eye of the user that is configured in a similar manner (and not shown in FIG. 10). The laser-based display 1000 comprises a laser assembly 1002. The laser assembly 1002 comprises a plurality of laser light sources 1004 which may each emit an associated color of light. For example, red laser light source 1004R emits red light, green laser light source 1004G emits green light, and blue laser light source 1004B emits blue light. Although only three laser light sources 1004 are shown, it will be appreciated that the laser assembly 1002 may include any suitable number of laser light sources 1004. For example, the laser assembly 1002 may include 0, 1, 2, 3, or more than 3 red laser light sources; 0, 1, 2, 3, or more than 3 green laser lights sources; and 0, 1, 2, 3, or more than 3 blue laser light sources. In some implementations, the laser assembly 1002 may include other laser light sources that emit laser light in other wavelengths (e.g., near-IR, IR).

Each of the laser light sources 1004 may be comprised of one or more laser diode emitters 1006. For example, each laser light source 1004 may include 1, 2, 3, or more than 3 laser diode emitters of a suitable color. Any combination or modification in the number of laser diode emitters may also be available (e.g., 2 red, 2 green, 2 blue, or 1 red, 1 green, 2 blue, etc.). Accordingly, any suitable number of laser light sources may be used to irradiate/illuminate pixels for generating image content. Further, each laser light source may have a suitable number of laser diode emitters 1006, which may be singular or arranged in an array for example.

In some, though not all, configurations, the laser assembly 1002 also includes a collimating lens assembly 1008 (or other diffractive optical element) that is structured to direct light to another location or otherwise operate on the light in some manner. In this example, each of the laser light sources 1004R, 1004G, and 1004B has a corresponding collimating lens 1008, individually labeled 1008R, 1008G, 1008B. In some implementations, however, a single collimating lens may be used for more than one laser light source.

The laser-based display 1000 includes combination optics 1010 configured to spatially combine the light beams lased from the plurality of laser light sources 1004R, 1004G, and 1004B into a single light beam.

The laser-based display 1000 includes a micro-electromechanical systems (MEMS) mirror system 1012. The MEMS mirror system 1012 is configured to collect laser light from the combination optics 1010, which combines light lased from three different sources (i.e., the laser light sources 1004R, 1004G, and 1004B) into a single light beam, in this example. Additionally, the MEMS mirror system 1012 is configured to direct laser light 1014A (which, in this example includes red laser light, green laser light, and blue laser light) to a waveguide 1016. Furthermore, the MEMS mirror system 1012 is configured to redirect its mirrors/mirror array so that the laser light 1014A is aimed at different locations at the waveguide 1016. As shown, laser lights 1014B and 1014C are aimed at different locations on the waveguide 1016. In this manner, the MEMS mirror system 1012 is able to route light to different locations by adjusting the aim of its corresponding mirror array. It will be appreciated that the laser lights 1014A, 1014B, 1014C may be modulated to include varying degrees or intensities (or even an absence of any one or more) of red, green, blue, or other color, laser light.

The waveguide 1016 is configured to redirect or propagate the laser light 1014A, 1014B, 1014C to a desired location which is viewable by an eye 1018 of the user. It will be appreciated that waveguide 1016 may be any type of waveguide display (e.g., a surface relief grating waveguide).

The laser light 1014A, 1014B, 1014C enters the waveguide 1016 via an entry grating 1020. The laser light 1014A, 1014B, 1014C then propagates (e.g., via total internal reflection) through the waveguide 1016 until it reaches an exit grating 1022. It will be appreciated that the angles with which the laser light 1014A, 1014B, 1014C enters the waveguide 1016 are preserved as the laser light 1014A, 1014B, 1014C propagates through the waveguide 1016. This condition is shown by the different angles that each of the respective laser lights 1014A, 1014B, 1014C propagate through the waveguide 1016. By configuring the entry grating 1020 and the exit grating 1022 to meet certain design parameters, the MEMS mirror system 1012 is able to use waveguide 1016 to propagate light towards the eye 1018 of the user.

The laser assembly 1002 and the MEMS mirror system 1012 are controlled by a controller 1024. In some implementations, the controller 1024 is integrated into the image source 924 shown in FIG. 9. The controller 1024 is configured to control the MEMS mirror system 1012 in conjunction with the laser assembly 1002 to progressively scan a set of pixels 1026 that collectively form the FOV 1028 of the laser-based display 1000. In particular, the controller 1024 is configured to adjust the MEMS mirror system 1012 so that the combined RGB laser beam or light is aimed at different locations for the eye 1018 of the user to view. Individual pixels of the set of pixels 1026 may be scanned in such a rapid manner that the entirety of a resulting image appears before the eye 1018 of the user in the FOV 1028 without the user perceiving that the image was progressively scanned pixel by pixel and line by line. In this way, the laser-based display 1000 may project or render image content for a user to view in the FOV 1028.

In some implementations, the locations of the laser light emitted from the waveguide 1016 are set at a default focal distance from the eye 1018 of the user. In some scenarios, the display 1000 is adjusted to a position where at least some portion of the display 1000 is occluded from the eye 1018 of the user. Further, in some scenarios the display 1000 is adjusted to a position beyond the default focal distance, which may cause vignetting of the display 1000. To compensate for such vignetting, the controller 1024 is configured to adjust the FOV 1028 to be visible within a vignette region as discussed herein with reference to FIG. 6A, such that displayed content is visible to the eye 1018 of the user even when the display is moved beyond the default focal distance set for the laser-based display 1000.

The MEMS mirror system 1012 may be able to scan an image (i.e., pixels of that image) at any image resolution or range of image resolutions (e.g., in cases where foveated rendering is used). In one example, the MEMS mirror system 1012 is configured to scan RGB light from the laser assembly 1002 with a resolution of 2,000 pixels by 1,200 pixels. In other examples, the MEMS mirror system 1012 is configured to scan RGB light from the laser assembly 1002 with another resolution.

During a display scan operation, the controller 1024 is configured to control the laser light sources 1004 to scan activated pixels of the display 1000 that reside in the FOV 1028. Note that in some scenarios deactivated pixels that reside outside of the FOV 1028 are not scanned in order to reduce power consumption of the laser-based display 1000.

Figure 11:
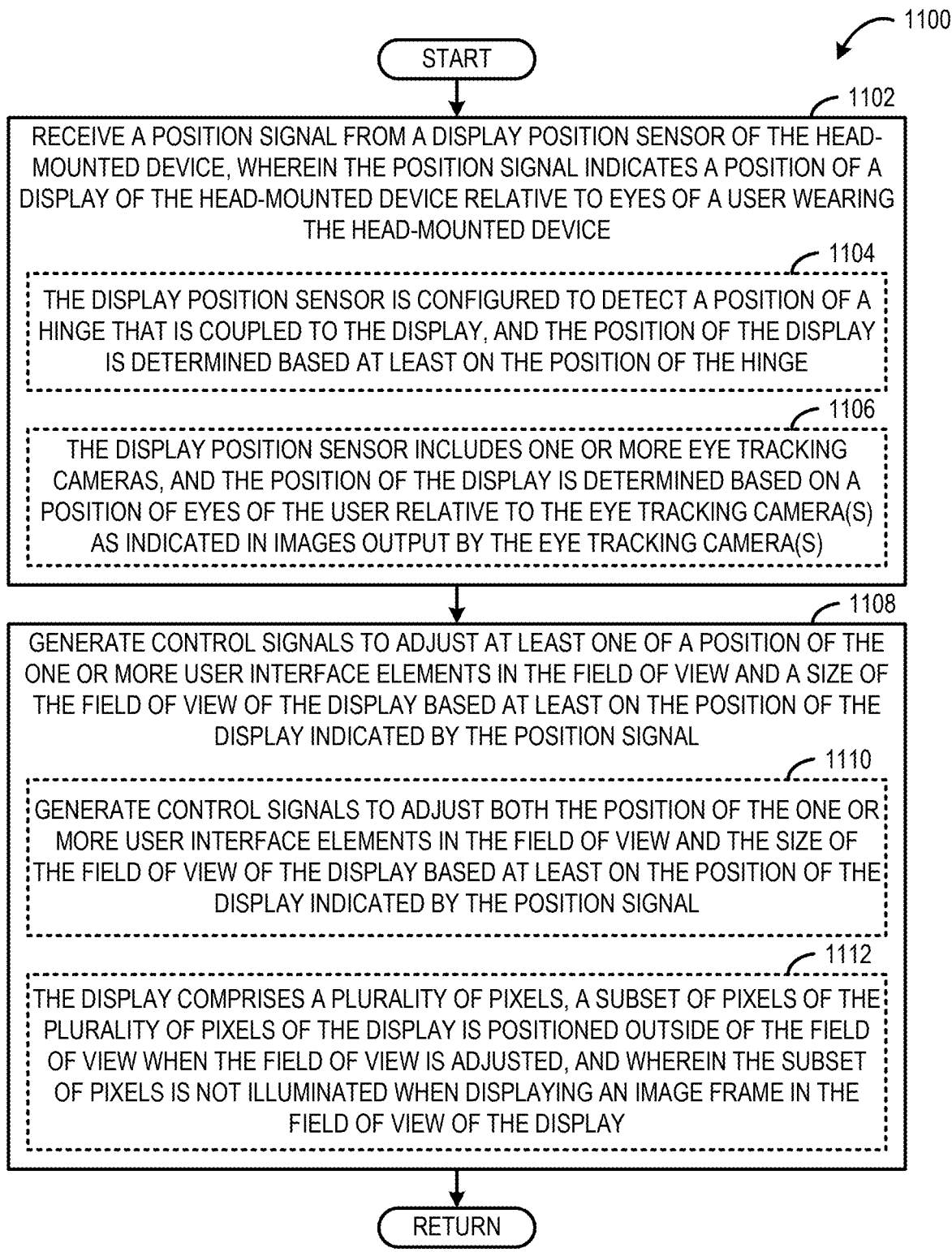
FIG. 11 shows an example method of controlling an HMD.

FIG. 11 shows an example method 1100 for controlling an HMD. For example, the method 1100 may be performed to control the HMD 102 shown in FIGS. 1, 3, 5, 7, the HMD 900 shown in FIG. 9, or any other suitable HMD comprising an adjustable display. Method steps that are indicated by dotted lines optionally may be performed in some implementations.

At 1102, the method 1100 includes receiving a position signal from a display position sensor of the head-mounted device, wherein the position signal indicates a position of a display of the head-mounted device relative to eyes of a user wearing the head-mounted device.

In some implementations where the display position sensor is integrated into a hinge that is coupled to the display, at 1106, the position of the display is determined based at least on the position of the hinge.

In some implementations where the display position sensor includes one or more eye tracking cameras, at 1106, the position of the display is determined based at least on a position of the eyes of the user relative to the eye tracking camera(s) as indicated in images output by the eye tracking camera(s).

At 1108, the method 1100 includes generating control signals to adjust at least one of a position of one or more user interface elements in a GUI displayed in a FOV of the display and a size of the FOV of the display based at least on the position of the display indicated by the position signal.

In some implementations, at 1110, the method 1100 may include generating control signals to adjust both the position of the one or more user interface elements in the FOV and the size of the FOV of the display based at least on the position of the display indicated by the position signal.

In some implementations, at 1112, a subset of pixels of the plurality of pixels of the display is positioned outside of the FOV when the field of view is adjusted, and the subset of pixels is not illuminated when an image frame is display in the FOV of the display.

The method 1100 may be performed to dynamically adjust the position of the user interface elements in the GUI based at least on the position of the display relative to the eyes of the user. This technical feature provides the technical benefit of enabling the user to view the user interface elements in the GUI even when the position of the display is adjusted relative to the eyes of the user to where the user interface elements would normally be occluded or difficult to view. Additionally, the method 1100 may be performed to dynamically adjust the size of the FOV of the display based at least on the position of the display relative to the eyes of the user. This technical feature provides the technical benefit of allowing the user to view the entire FOV even when the position of the display is adjusted relative to the eyes of the user to where the FOV would normally be occluded or difficult to view. Moreover, any pixels that are outside the FOV and beyond the field of vision of the eyes of the user can be deactivated in order to reduce power consumption of the display. In general, such technical features provide the technical benefit of allowing a user to freely wear the HMD and position the display in a manner which best suits their current need, while still allowing the user to view critical information displayed in the GUI of the display.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 12:
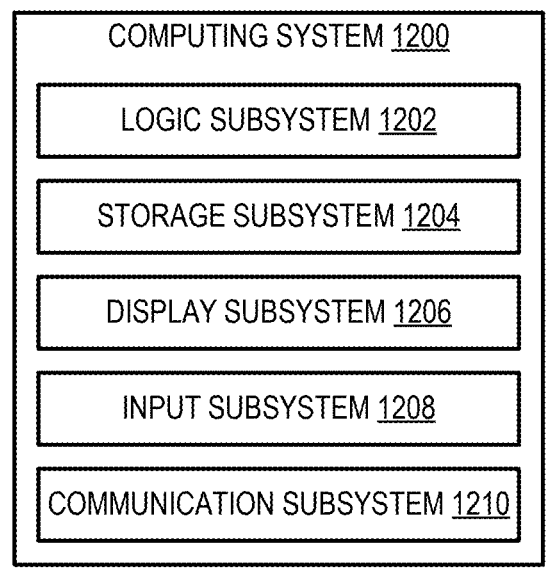
FIG. 12 shows an example computing system.

FIG. 12 schematically shows a simplified representation of a computing system 1200 configured to provide any to all of the compute functionality described herein. For example, the computing system 1200 may correspond to the HMD 102 shown in FIGS. 1, 3, 5, 7 and the HMD 900 shown in FIG. 9. Computing system 1200 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1200 includes a logic subsystem 1202 and a storage subsystem 1204. Computing system 1200 may optionally include a display subsystem 1206, input subsystem 1208, communication subsystem 1210, and/or other subsystems not shown in FIG. 12.

Logic subsystem 1202 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem may optionally be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1204 includes one or more physical devices configured to temporarily and/or permanently hold computer information such as data and instructions executable by the logic subsystem. When the storage subsystem includes two or more devices, the devices may be collocated and/or remotely located. Storage subsystem 1204 may include volatile, nonvolatile, dynamic, static, read/write, read-only, random-access, sequential-access, location-addressable, file-addressable, and/or content-addressable devices. Storage subsystem 1204 may include removable and/or built-in devices. When the logic subsystem executes instructions, the state of storage subsystem 1204 may be transformed—e.g., to hold different data.

Aspects of logic subsystem 1202 and storage subsystem 1204 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The term "module" may be used to describe an aspect of computing system 1200 implemented to perform a particular function. In some cases, a module may be instantiated via logic machine 1202 executing instructions held by storage subsystem 1204. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

When included, display subsystem 1206 may be used to present a visual representation of data held by storage subsystem 1204. This visual representation may take the form of a graphical user interface (GUI). Display subsystem 1206 may include one or more display devices utilizing virtually any type of technology. In some implementations, display subsystem may include one or more virtual-, augmented-, or mixed reality displays.

When included, input subsystem 1208 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1210 may be configured to communicatively couple computing system 1200 with one or more other computing devices. Communication subsystem 1210 may include wired and/or wireless communication devices compatible with one or more different communication protocols. The communication subsystem may be configured for communication via personal-, local- and/or wide-area networks.

In an example, a head-mounted device comprises a display configured to display a graphical user interface including one or more user interface elements in a field of view of the display, a display position sensor configured to output a position signal indicating a position of the display relative to eyes of a user wearing the head-mounted device, a logic subsystem, and a storage subsystem holding instructions executable by the logic subsystem to receive the position signal from the display position sensor, and generate control signals to adjust at least one of a position of the one or more user interface elements in the field of view and a size of the field of view of the display based at least on the position of the display indicated by the position signal. In this example and/or other examples, the field of view may be set to a first size based at least on the position signal indicating that the display is at a first position relative to the eyes of the user, the position signal may indicate that the display is adjusted from the first position to a second position that is closer to the eyes of the user than the first position, and the size of the field of view of the display may be set to a second size that is less than the first size based at least on the display being at the second position. In this example and/or other examples, the size of the field of view may be set to maintain a same angular field of view when the display is at the first position and when the display is at the second position. In this example and/or other examples, the display may comprise a plurality of pixels, a subset of pixels of the plurality of pixels of the display may be positioned outside of the field of view when the field of view is set to the second size, and the subset of pixels may not be illuminated when the field of view is set to the second size. In this example and/or other examples, the position signal may indicate that the display is adjusted to a third position that is further from the eyes of the user than the first position, and the size of the field of view of the display may be set to a third size that is less than the first size based at least on the display being at the third position. In this example and/or other examples, the one or more user interface elements may be positioned according to a first arrangement to fit in the field of view when the field of view is set to the first size based at least on the position signal indicating that the display is at the first position relative to the eyes of the user, and the one or more user interface elements may be positioned according to a second arrangement to fit in the field of view when the field of view is set to the second size based at least on the position signal indicating that the display is at the second position. In this example and/or other examples, the one or more user interface elements may be positioned at a first position in the field of view based at least on the position signal indicating that the display is at a first position relative to the eyes of the user, the position signal may indicate that the display is pivoted upward from the first position to a second position that is higher than the first position relative to the eyes of the user, and the one or more user interface elements may be positioned at a second position in the field of view that is lower than the first position based at least on the display being at the second position. In this example and/or other examples, the position signal may indicate that the display is adjusted to a position in which a first region of the display is occluded from the eyes of the user and a second region of the display is visible by the eyes of the user, and at least one of the one or more user interface elements may be adjusted to be positioned in the second region and the size of the field of view of the display is adjusted to fit within the second region based at least on the position of the display indicated by the position signal. In this example and/or other examples, the storage subsystem may hold instructions executable by the logic subsystem to generate control signals to adjust both the position of the one or more user interface elements in the field of view and the size of the field of view of the display based at least on the position of the display indicated by the position signal. In this example and/or other examples, the head-mounted device may further comprise a frame configured to secure the head-mounted device to a head of the user, a hinge coupled between the frame and the display, the hinge may be configured to adjust the position of the display relative to the frame, the display position sensor may be configured to detect a position of the hinge, and the position of the display may be based at least on the position of the hinge. In this example and/or other examples, the display position sensor may comprise an eye tracking camera of the head-mounted device.

In another example, a method for controlling a head-mounted device comprises receiving a position signal from a display position sensor of the head-mounted device, the position signal indicates a position of a display of the head-mounted device relative to eyes of a user wearing the head-mounted device, and generating control signals to adjust at least one of a position of one or more user interface elements in a graphical user interface displayed in a field of view of the display and a size of the field of view of the display based at least on the position of the display indicated by the position signal. In this example and/or other examples, the field of view may be set to a first size based at least on the position signal indicating that the display is at a first position relative to the eyes of the user, the position signal may indicate that the display is adjusted from the first position to a second position that is closer to the eyes of the user than the first position, and the size of the field of view of the display maybe set to a second size that is less than the first size based at least on the display being at the second position. In this example and/or other examples, the position signal may indicate that the display is adjusted to a third position that is further from the eyes of the user than the first position, and the size of the field of view of the display may be set to a third size that is less than the first size based at least on the display being at the third position. In this example and/or other examples, the one or more user interface elements may be positioned according to a first arrangement to fit in the field of view when the field of view is set to the first size based at least on the position signal indicating that the display is at the first position relative to the eyes of the user, and the one or more user interface elements may be positioned according to a second arrangement to fit in the field of view when the field of view is set to the second size based at least on the position signal indicating that the display is at the second position. In this example and/or other examples, the one or more user interface elements may be positioned at a first position in the field of view based at least on the position signal indicating that the display is at a first position relative to the eyes of the user, the position signal may indicate that the display is pivoted upward from the first position to a second position that is higher than the first position relative to the eyes of the user, and the one or more user interface elements may be positioned at a second position in the field of view that is lower than the first position based at least on the display being at the second position. In this example and/or other examples, the position signal may indicate that the display is adjusted to a position in which a first region of the display is occluded from the eyes of the user and a second region of the display is visible by the eyes of the user, and at least one of the one or more user interface elements may be adjusted to be positioned in the second region and the size of the field of view of the display is adjusted to fit within the second region based at least on the position of the display indicated by the position signal.

In yet another example, a head-mounted device comprises a display configured to display a graphical user interface including one or more user interface elements in a field of view of the display, a display position sensor configured to output a position signal indicating a position of the display relative to eyes of a user wearing the head-mounted device, a logic subsystem, and a storage subsystem holding instructions executable by the logic subsystem to receive the position signal from the display position sensor, and generate control signals to adjust both a position of the one or more user interface elements in the field of view and the size of the field of view of the display based at least on the position of the display indicated by the position signal. In this example and/or other examples, the position signal may indicate that the display is adjusted to a position in which a first region of the display is occluded from the eyes of the user and a second region of the display is visible by the eyes of the user, and at least one of the one or more user interface elements may be adjusted to be positioned in the second region and the size of the field of view of the display is adjusted to fit within the second region based at least on the position of the display indicated by the position signal. In this example and/or other examples, the first region of the display that is occluded may be located above the second region of the display that is visible.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted device comprising
a display configured to display a graphical user interface including one or more user interface elements in a field of view of the display;
a display position sensor configured to output a position signal indicating a position of the display relative to eyes of a user wearing the head-mounted device;
a logic subsystem; and
a storage subsystem holding instructions executable by the logic subsystem to:
receive the position signal from the display position sensor;
generate control signals to adjust a size of the field of view of the display to a first size based at least on the position signal indicating that the display is at a first position relative to the eyes of the user; and
generate control signals to adjust the size of the field of view of the display to a second size that is less than the first size based at least on the position signal indicating that the display is at a second position that is closer to the eyes than the first position.

2. The head-mounted device of claim 1, wherein the size of the field of view is set to maintain a same angular field of view when the display is at the first position and when the display is at the second position.

3. The head-mounted device of claim 1, wherein the display comprises a plurality of pixels, wherein a subset of pixels of the plurality of pixels of the display is positioned outside of the field of view when the field of view is set to the second size, and wherein the subset of pixels is not illuminated when the field of view is set to the second size.

4. The head-mounted device of claim 1, wherein the position signal indicates that the display is adjusted to a third position that is further from the eyes of the user than the first position, and wherein the size of the field of view of the display is set to a third size that is less than the first size based at least on the display being at the third position.

5. The head-mounted device of claim 1, wherein the one or more user interface elements are positioned according to a first arrangement to fit in the field of view when the field of view is set to the first size based at least on the position signal indicating that the display is at the first position relative to the eyes of the user, and wherein the one or more user interface elements are positioned according to a second arrangement to fit in the field of view when the field of view is set to the second size based at least on the position signal indicating that the display is at the second position.

6. The head-mounted device of claim 1, wherein the one or more user interface elements are displayed at a first size in the field of view based at least on the position signal indicating that the display is at the first position relative to the eyes of the user, wherein the position signal indicates that the display is moved from the first position to the second position, and wherein the one or more user interface elements are displayed at a second size that is smaller than the first size in the field of view based at least on the display being at the second position.

7. The head-mounted device of claim 1, wherein the position signal indicates that the display is adjusted to a partial-view position in which a first region of the display is occluded from the eyes of the user and a second region of the display is visible by the eyes of the user, and wherein at least one of the one or more user interface elements are adjusted to be positioned in the second region and the size of the field of view of the display is adjusted to fit within the second region based at least on the position signal indicating that the display is adjusted to the partial-view position.

8. The head-mounted device of claim 1, wherein the storage subsystem holds instructions executable by the logic subsystem to generate control signals to adjust both a position of the one or more user interface elements in the field of view and the size of the field of view of the display based at least on the position of the display indicated by the position signal.

9. The head-mounted device of claim 1, further comprising:
a frame configured to secure the head-mounted device to a head of the user;
a hinge coupled between the frame and the display, wherein the hinge is configured to adjust the position of the display relative to the frame; and
wherein the display position sensor is configured to detect a position of the hinge, and wherein the position of the display is based at least on the position of the hinge.

10. The head-mounted device of claim 1, wherein the display position sensor comprises an eye tracking camera of the head-mounted device.

11. A method for controlling a head-mounted device, comprising:
receiving a position signal from a display position sensor of the head-mounted device, wherein the position signal indicates a position of a display of the head-mounted device relative to eyes of a user wearing the head-mounted device;
generating control signals to adjust a size of a field of view of the display to a first size based at least on the position signal indicating that the display is at a first position relative to the eyes of the user; and
generating control signals to adjust the size of the field of view of the display to a second size that is less than the first size based at least on the position signal indicating that the display is at a second position that is closer to the eyes of the user than the first position.

12. The method of claim 11, wherein the position signal indicates that the display is adjusted to a third position that is further from the eyes of the user than the first position, and wherein the size of the field of view of the display is set to a third size that is less than the first size based at least on the display being at the third position.

13. The method of claim 11, wherein one or more user interface elements are positioned according to a first arrangement to fit in the field of view when the field of view is set to the first size based at least on the position signal indicating that the display is at the first position relative to the eyes of the user, and wherein the one or more user interface elements are positioned according to a second arrangement to fit in the field of view when the field of view is set to the second size based at least on the position signal indicating that the display is at the second position.

14. The method of claim 11, wherein one or more user interface elements are displayed at a first size in the field of view based at least on the position signal indicating that the display is at the first position relative to the eyes of the user, wherein the position signal indicates that the display is moved from the first position to the second position, and wherein the one or more user interface elements are displayed at a second size that is smaller than the first size in the field of view based at least on the display being at the second position.

15. The method of claim 11, wherein the position signal indicates that the display is adjusted to a partial-view position in which a first region of the display is occluded from the eyes of the user and a second region of the display is visible by the eyes of the user, and wherein one or more user interface elements are adjusted to be positioned in the second region and the size of the field of view of the display is adjusted to fit within the second region based at least on the position signal indicating that the display is adjusted to the partial-view position.

16. A head-mounted device comprising
a display configured to display a graphical user interface including one or more user interface elements in a field of view of the display;
a display position sensor configured to output a position signal indicating a position of the display relative to eyes of a user wearing the head-mounted device;
a logic subsystem; and
a storage subsystem holding instructions executable by the logic subsystem to:
receive the position signal from the display position sensor, wherein the position signal indicates that the display is adjusted to a partial-view position in which a first region of the display is occluded from the eyes of the user and a second region of the display is visible to the eyes of the user; and
generate control signals to adjust a position of the one or more user interface elements to be positioned in the second region of the display based at least on the position signal indicating that the display is adjusted to the partial-view position in which the first region of the display is occluded from the eyes of the user and the second region of the display is visible to the eyes of the user.

17. The head-mounted device of claim 16, wherein the field of view is set to a first size based at least on the display being positioned at a full-view position in which the first region of the display and the second region of the display are visible to the eyes of the user, and wherein the field of view is set to a second size that is less than the first size based at least on the display being positioned at the partial-view position in which the first region of the display is occluded from the eyes of the user and the second region of the display is visible to the eyes of the user.

18. The head-mounted device of claim 16, wherein a size of the one or more user interface elements are set to a first size based at least on the display being positioned at a full-view position in which the first region of the display and the second region of the display are visible to the eyes of the user, and wherein the one or more user interface elements are set to a second size that is less than the first size based at least on the display being positioned at the partial-view position in which the first region of the display is occluded from the eyes of the user and the second region of the display is visible to the eyes of the user.

19. The head-mounted device of claim 16, wherein the one or more user interface elements are positioned according to a first arrangement based at least on the display being positioned at a full-view position in which the first region of the display and the second region of the display are visible to the eyes of the user, and wherein the one or more user interface elements are positioned according to a second arrangement based at least on the display being positioned at the partial-view position in which the first region of the display is occluded from the eyes of the user and the second region of the display is visible to the eyes of the user.

20. The head-mounted device of claim 16, wherein the one or more user interface elements are displayed in the field of view of the display based at least on the display being positioned at a full-view position in which the first region of the display and the second region of the display are visible to the eyes of the user, and wherein a subset of the one or more user interface elements are display in the field of view of the display based at least on the display being positioned at the partial-view position in which the first region of the display is occluded from the eyes of the user and the second region of the display is visible to the eyes of the user.

* * * * *